Figure 1:
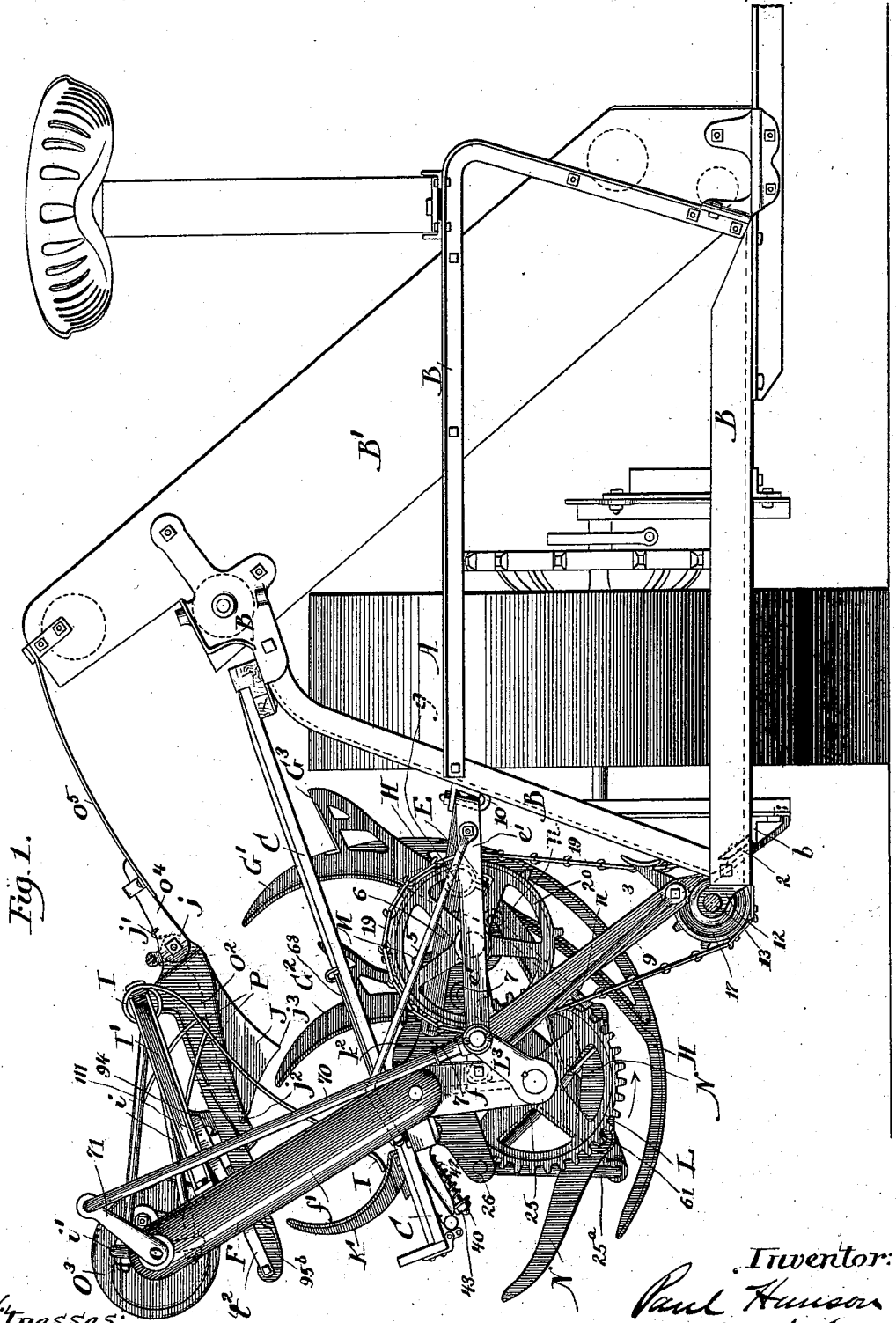

(No Model.) 9 Sheets—Sheet 1.

P. HANSON.
GRAIN BINDER.

No. 510,174. Patented Dec. 5, 1893.

Witnesses:
Fred Gerlach
J. B. Carpenter

Inventor:
Paul Hanson
By Pierce & Fisher
Attorneys

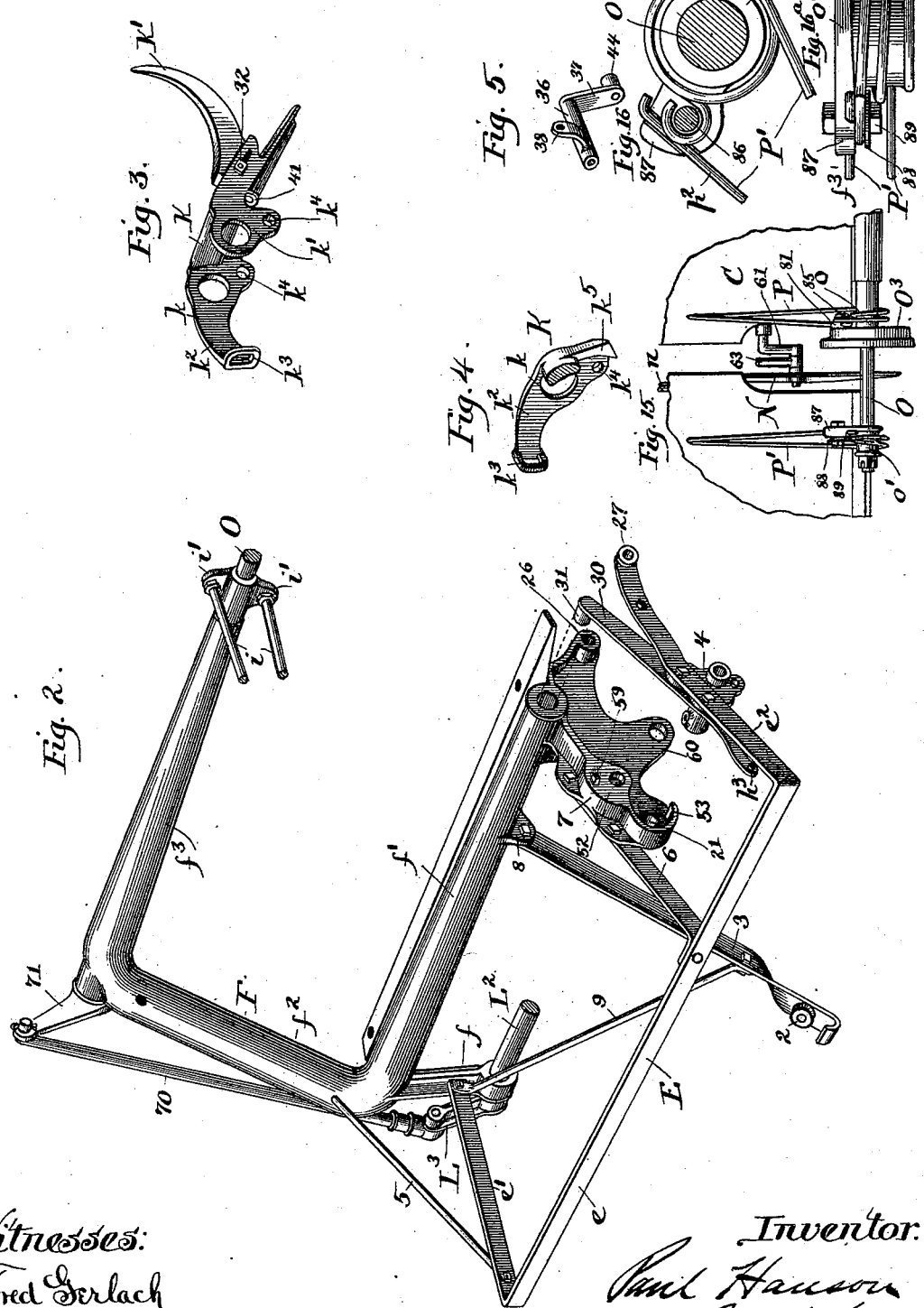

(No Model.) P. HANSON. 9 Sheets—Sheet 3
GRAIN BINDER.
No. 510,174. Patented Dec. 5, 1893.
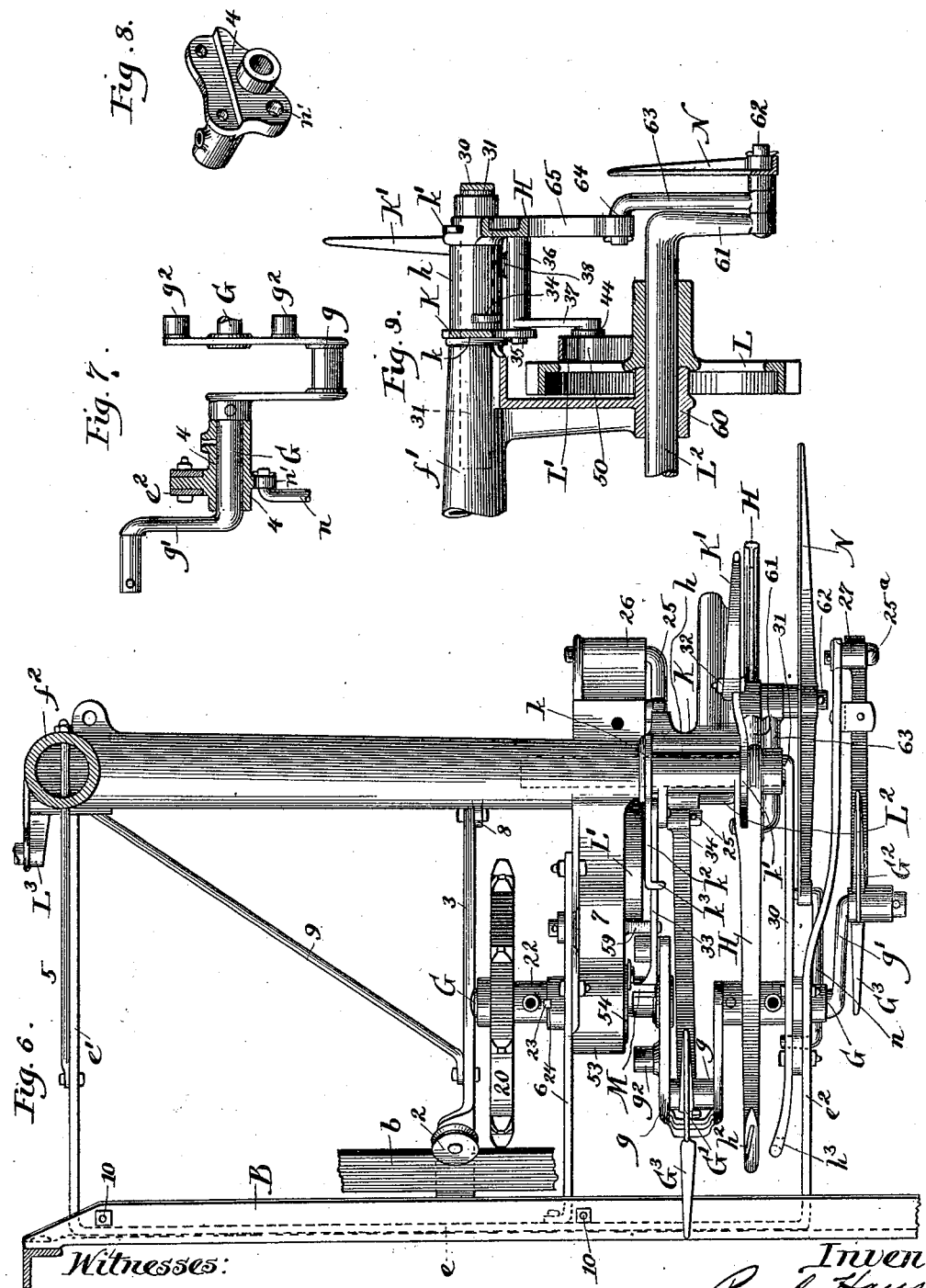
Witnesses:
Fred Gerlach
J. B. Carpenter
Inventor:
Paul Hanson
By Pim & Fisher
Attorneys.

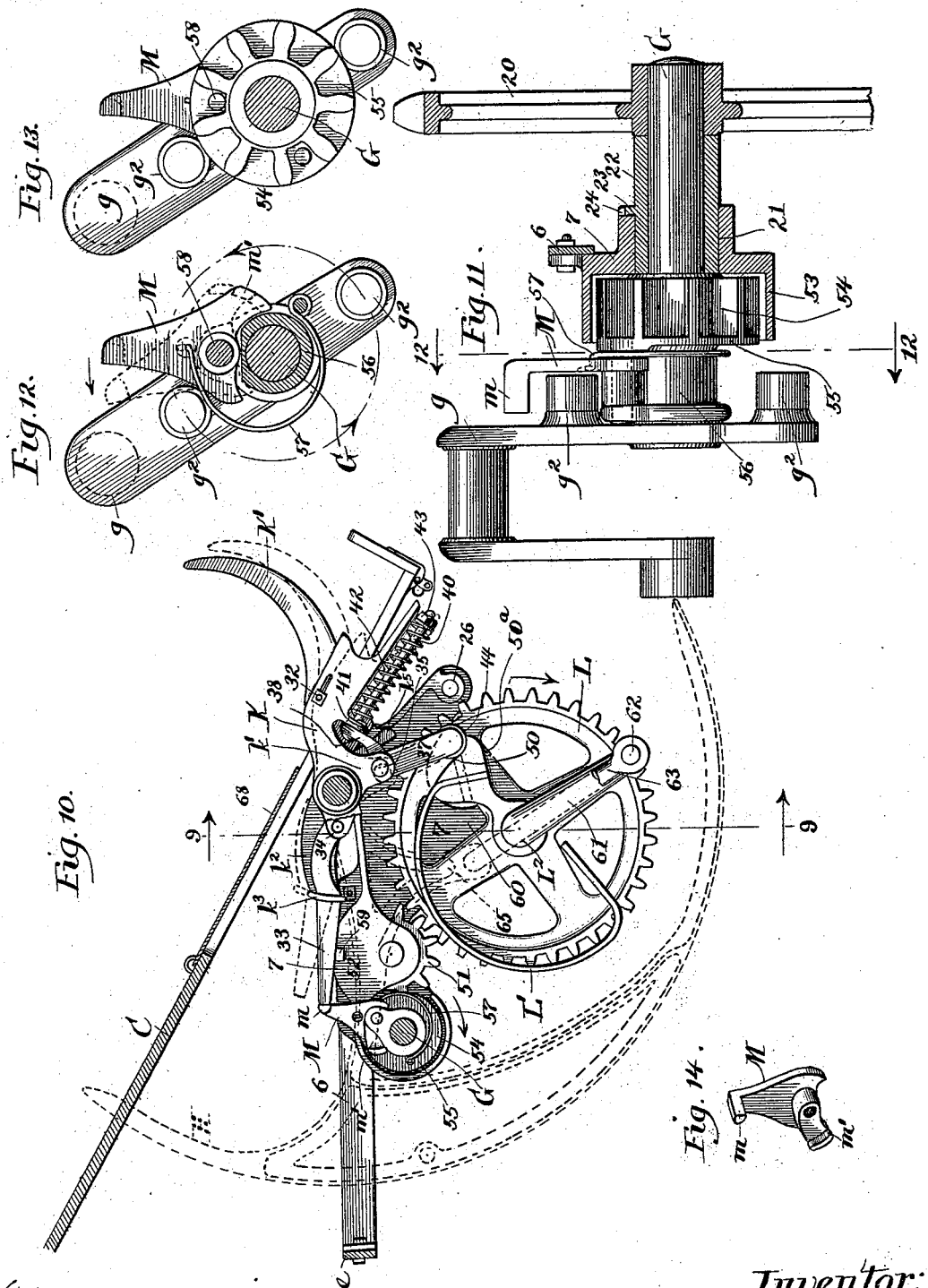

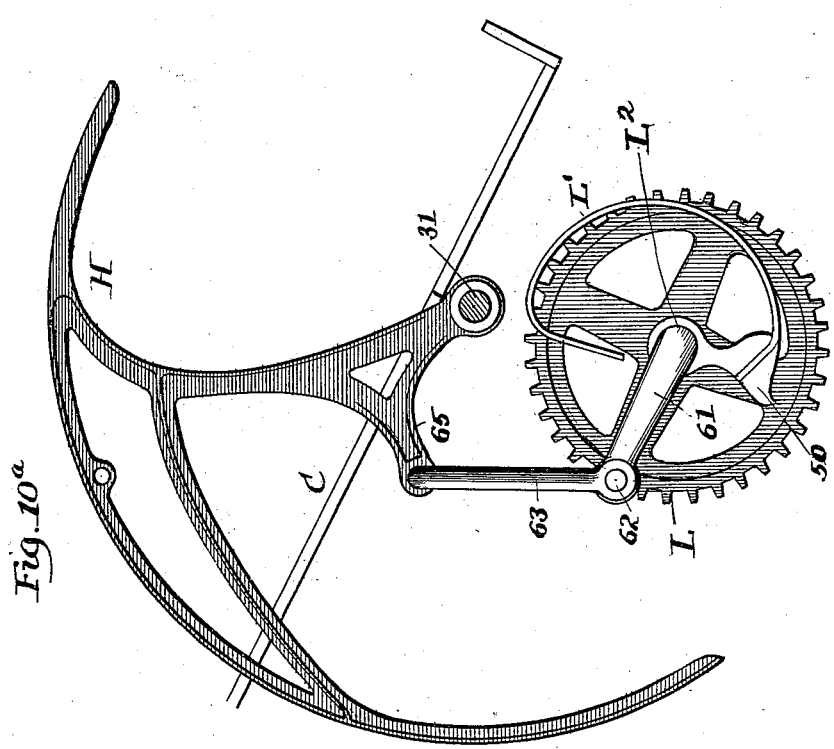

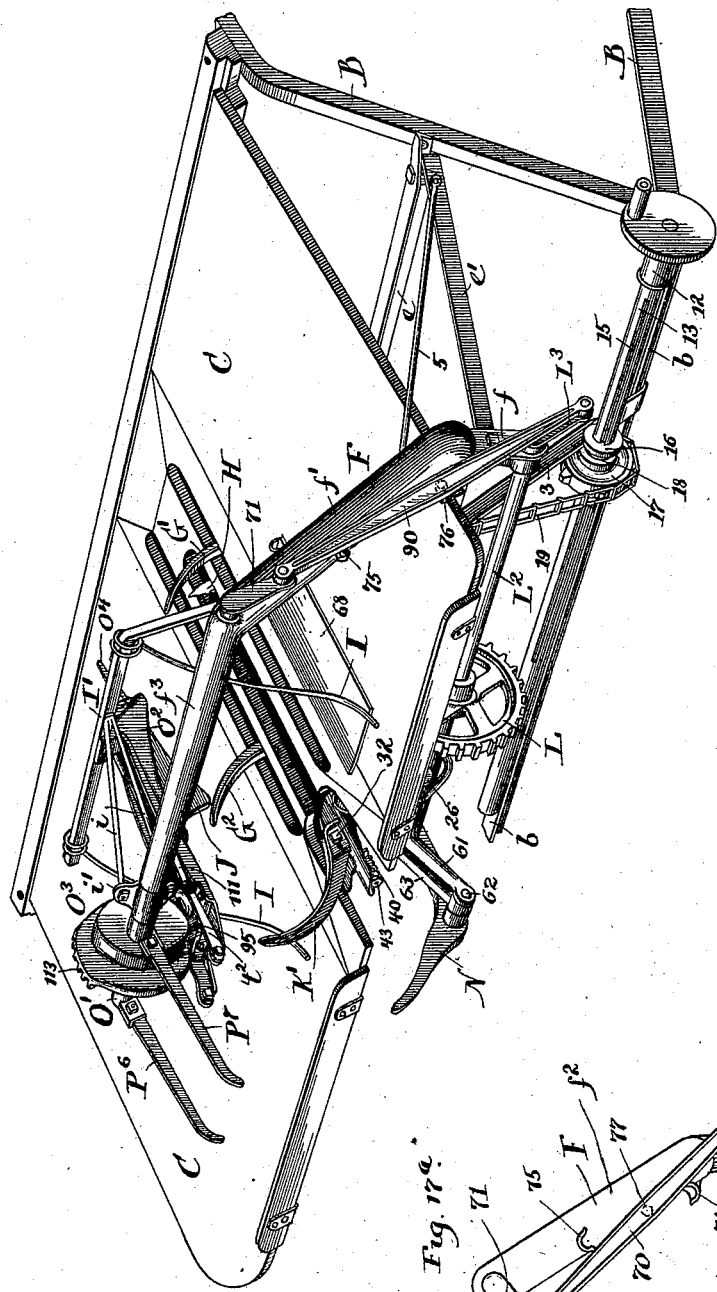

(No Model.) 9 Sheets—Sheet 7.
P. HANSON.
GRAIN BINDER.
No. 510,174. Patented Dec. 5, 1893.
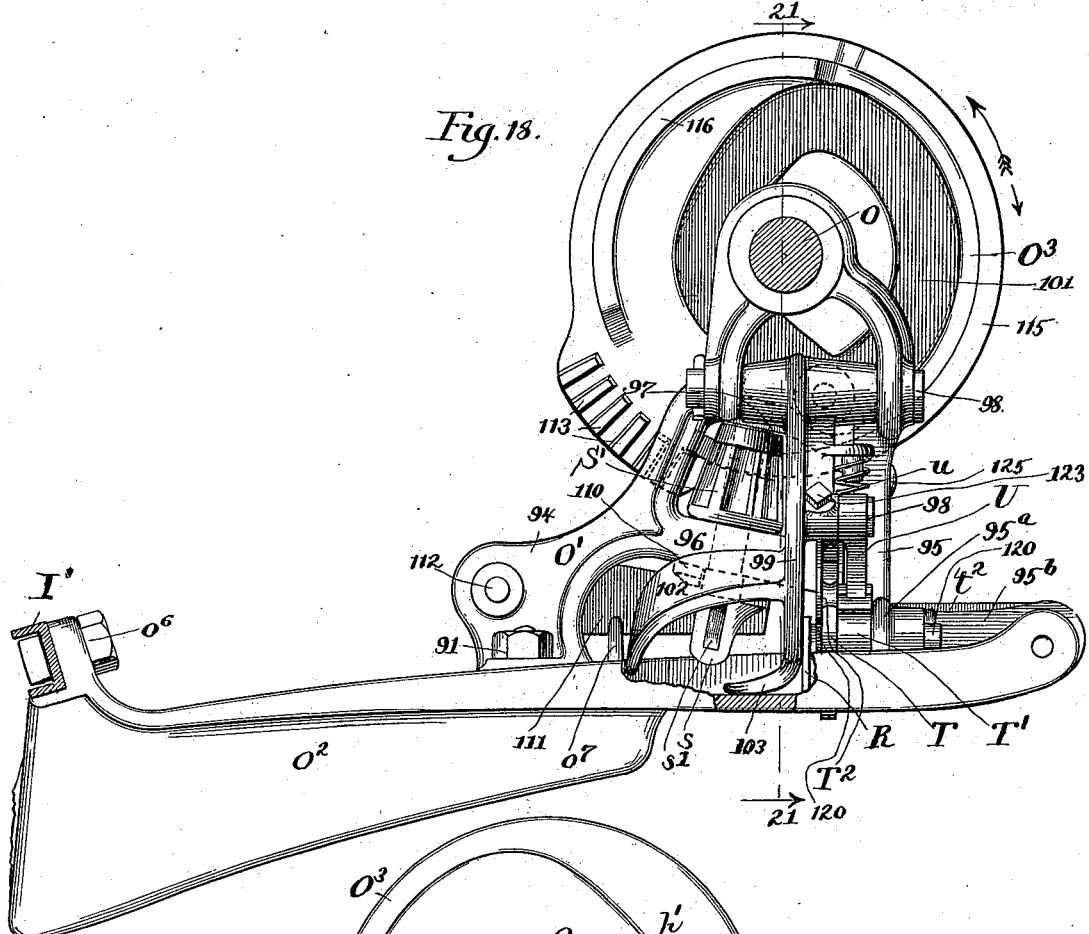
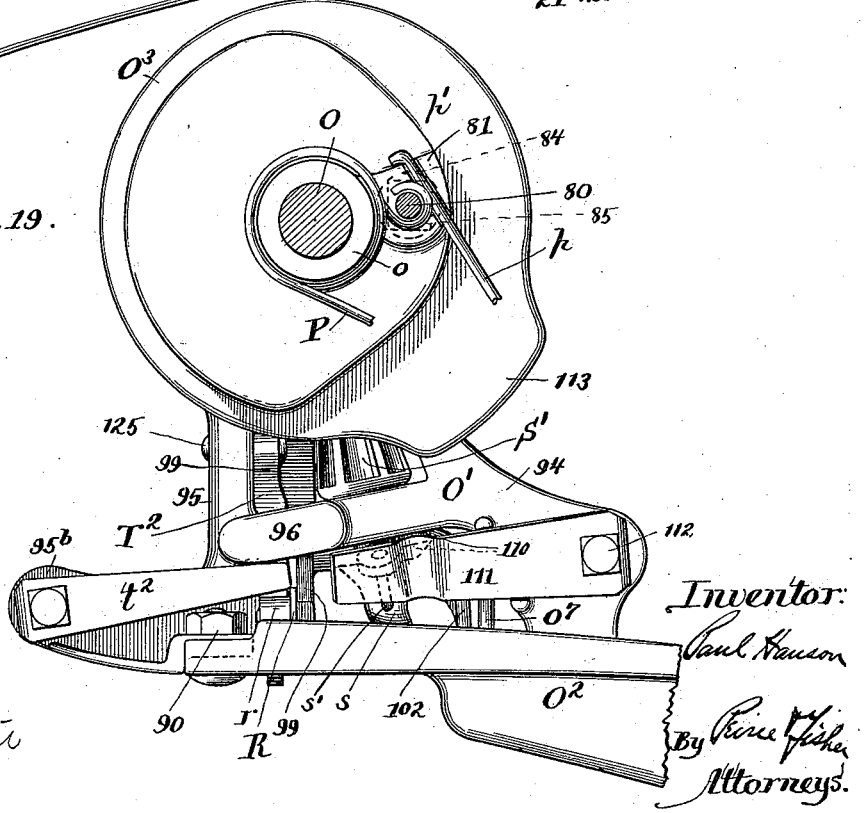
Witnesses:
Fred Gerlach
J. B. Carpenter
Inventor:
Paul Hanson
By Pierce & Fisher
Attorneys.

(No Model.) 9 Sheets—Sheet 8.
P. HANSON.
GRAIN BINDER.
No. 510,174. Patented Dec. 5, 1893.
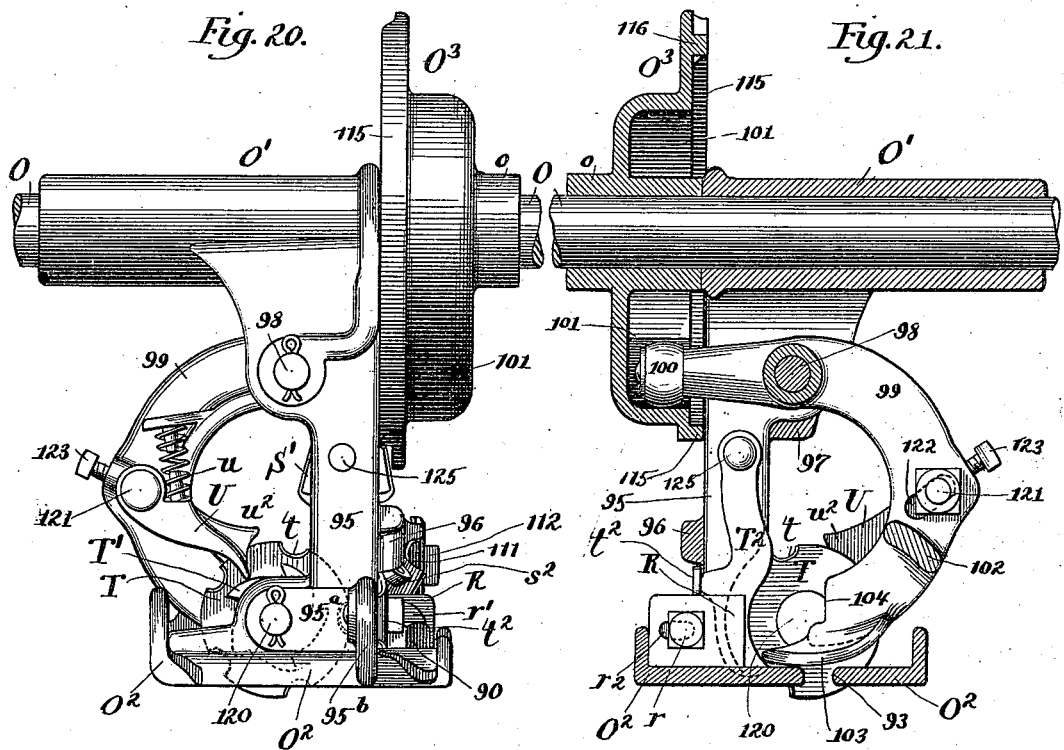
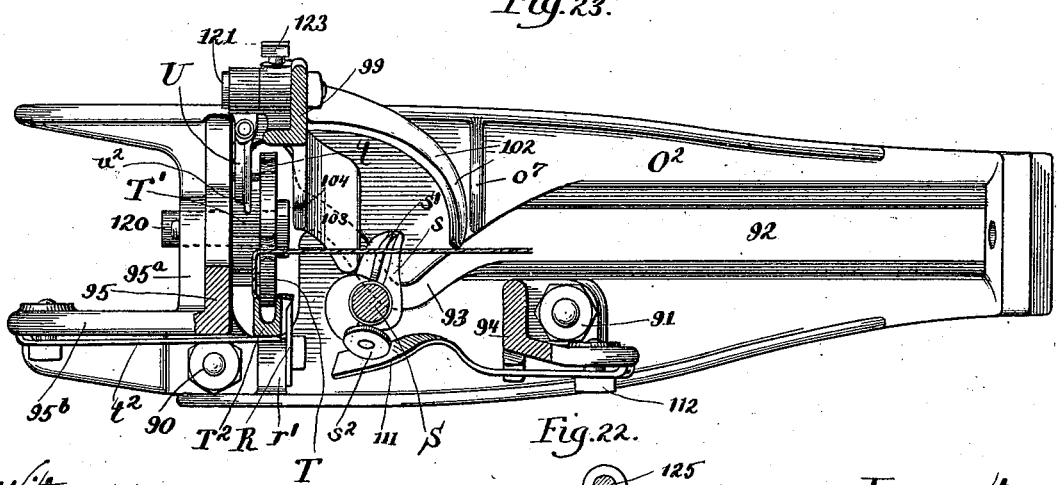
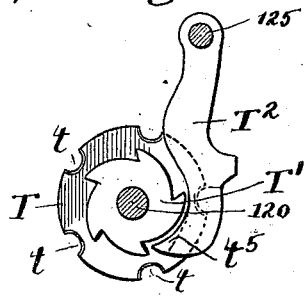
Witnesses:
Fred Gerlach
J. B. Carpenter
Inventor:
Paul Hanson
By Rice & Fisher
Attorneys (No Model.)　　　　　　　　　　　　　　　　9 Sheets—Sheet 9.

P. HANSON.
GRAIN BINDER.

No. 510,174.　　　　　　　　　　　Patented Dec. 5, 1893.

Witnesses:
Fred Gerlach
L. B. Carpenter.

Inventor:
Paul Hanson
By Prim & Fisher
Attorneys.

United States Patent Office.

PAUL HANSON, OF CHICAGO, ILLINOIS.

GRAIN-BINDER.

SPECIFICATION forming part of Letters Patent No. 510,174, dated December 5, 1893.

Application filed July 22, 1891. Serial No. 400,297. (No model.)

*To all whom it may concern:*

Be it known that I, PAUL HANSON, residing at Chicago, in the county of Cook and State of Illinois, have invented certain new and useful Improvements in Grain-Binders, of which I do declare the following to be a full, clear, and exact description, reference being had to the accompanying drawings, forming part of this specification.

My present invention has for one of its objects to provide simple, light and durable driving mechanism for imparting movement to the various parts of the binder mechanism, and to locate this driving mechanism beneath the binder deck or table.

My invention has also for its object to improve the mechanism in various particulars, as will be hereinafter described and particularly defined in the claims at the end of this specification.

In the drawings, like letters and figures of reference denote like parts of structure throughout.

Figure 24:
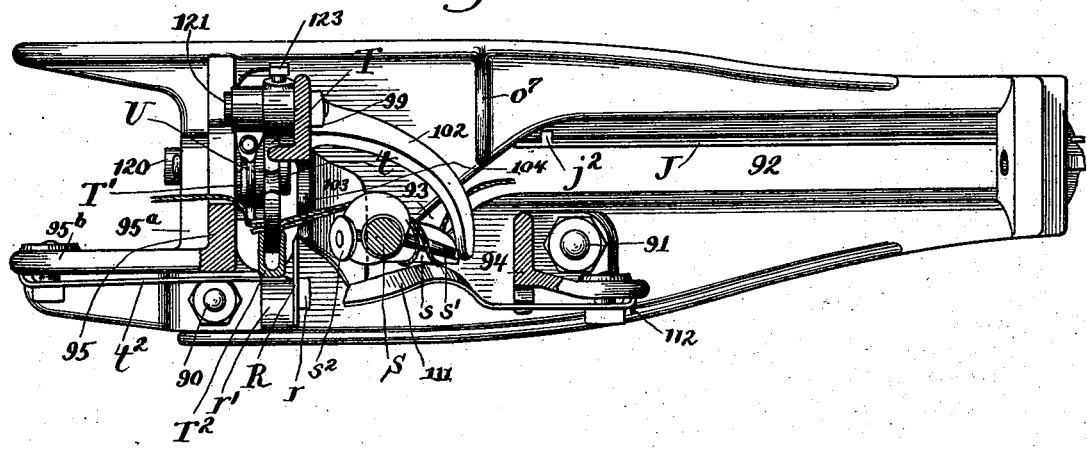
Figure 25:
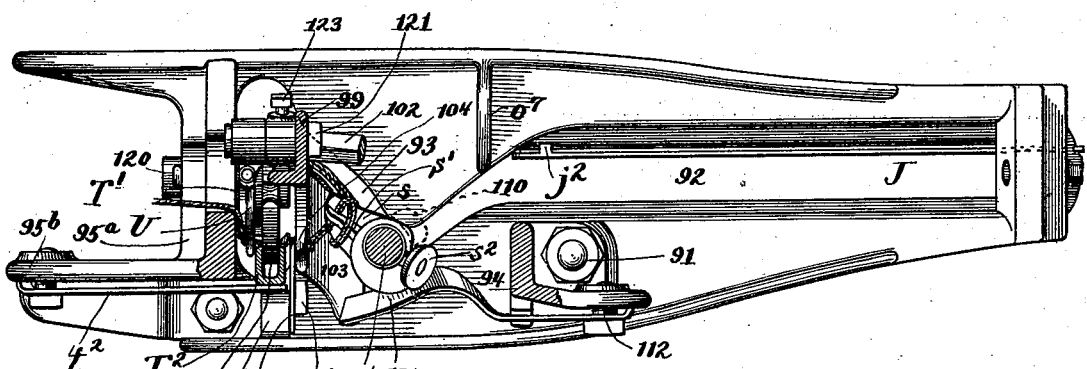
Figure 26:
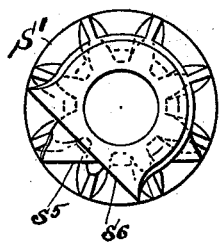
Figures 27, 28:
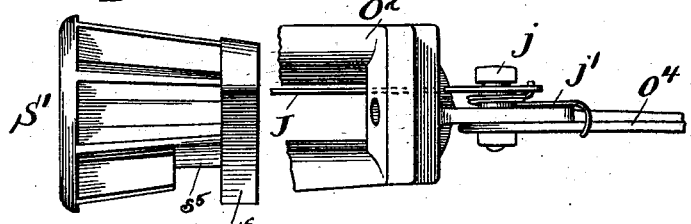
Figure 29:
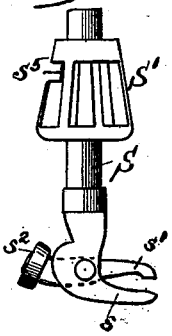

Figure 1 is a front elevation of a portion of a self-binding harvester, embodying my invention. Fig. 2 is a perspective view of a binder-frame wherein are supported the several parts of the binding mechanism. Fig. 3 is a perspective view of a compressor frame and arm which serves to retain the grain against the thrust of the packer-arms, and will, after a sufficient quantity of grain has been thrust against said compressor arm, permit the shift of the drive-dog or clutch into the path of the continually moving part to be engaged thereby, to effect the operation of the intermittently moving parts. Fig. 4 is a perspective view of a portion of the compressor frame. Fig. 5 is a detail perspective view of the compressor crank that will be journaled beneath the compressor frame. Fig. 6 is a plan view of the parts beneath the binder-deck or table, whereon the grain is placed to be bound. Fig. 7 is a detail view showing a portion of the packer drive shaft and (in section) one of the bearing brackets wherein said shaft is mounted. Fig. 8 is a perspective view of a bearing bracket wherein is mounted the packer drive shaft. Fig. 9 is a vertical sectional view on line 9—9 of Fig. 10 showing a portion of the binder mechanism. Fig. 10 is a rear end view of the binder mechanism, the binder frame and certain other parts being shown in section, and parts being removed for better illustration. Fig. 10ª is a detail side view showing the needle arm and the parts for operating the same. Fig. 11 is a detail view showing a portion of the packer drive shaft and the parts connected thereto, and one of the bearings wherein said shaft is supported, parts being shown in section. Fig. 12 is a detail view in vertical section at line 12—12 Fig. 11. Fig. 13 is a detail view showing a drive-pinion which carries a drive-dog and is mounted upon the packer drive shaft, and one of the packer-cranks, to which are secured rollers with which the drive-dog may engage and cause the drive dog and drive-pinion to rotate therewith. Fig. 14 is a detail perspective view of said drive dog. Fig. 15 is a detail plan view of the discharge and ejecting arms, parts being removed. Fig. 16 is a side view and Fig. 16ª a plan view of the spring discharge arms. Fig. 17ª is a detail front view showing modified mechanism for driving the knotter mechanism. Fig. 17 is a perspective view from the upper front portion of the machine showing the binding mechanism complete and showing modified mechanism for driving the knotter mechanism. Fig. 18 is a view in rear elevation of the knotter mechanism. Fig. 19 is a front elevation of the knotter mechanism a portion of the breast plate being broken away. Fig. 20 is a side view of the knotter mechanism looking from the stubble side of the machine. Fig. 21 is a view in vertical longitudinal section on line 21—21, Fig. 18, parts being shown in elevation. Fig. 22 is a detail view showing the parts for holding the cord. Fig. 23 is a horizontal, sectional view of the knotter mechanism, the parts being shown in the position they assume when at rest. Fig. 24 is a similar view, the parts being shown in the position they assume after the cord has been looped around a sheaf and the needle-arm is at the limit of its upward movement. Fig. 25 is a similar view, the parts being shown in the position they assume when the cord has been knotted and severed and the bundle is being discharged. Fig. 26 is a detail plan view of the pinion secured to the knotter bill-shaft. Fig. 27 is a side view of the same. Fig. 28 is a plan view of a portion of the knotter breast plate and parts supported thereby. Fig. 29 is a detail view of the knotter bill, its shaft and pinion.

A designates the main drive-wheel whereby is supported the stubble side of the harvester frame B in any well-known or convenient manner. The harvester frame B is of familiar construction, and is provided with the usual side boards B' between which the grain is elevated by suitable conveyer mechanism from the harvester platform to the binder deck or table C. The stubble side of the harvester frame B is provided with a rail $b$ preferably of angular shape, whereon will travel a friction roller 2 that is connected to the sustaining arm 3 of the supporting frame E, whereby the binder frame F is carried. This supporting frame E consists preferably of a bar having a main body $e$ with ends $e'$ and $e^2$ bent at right angles thereto, the end $e'$ being bolted to a journal bracket $f$ that depends from the lower arm $f'$ of the binder frame F, while the end $e^2$ is bolted to a packer-box 4, as seen in Fig. 2 of the drawings. Preferably, a tie-rod 5 connects the vertical post $f^2$ of the binder frame with the end bar $e'$ of the supporting frame E, and by preference also a cross bar 6 serves to unite this frame with the main housing 7 that is preferably cast in piece with the lower arm $f'$ of the binder frame. The supporting bar 3 of the binder frame has its upper end bolted as at 8 to a lug projecting from the lower arm $f'$ of the binder frame, and this bar 3 is preferably braced by a rod 9, bolted adjacent the lower end of the bar 3 and bolted also to the journal bracket $f$ that depends from the lower arm $f'$ of the binder frame. The binder frame F is of the usual U-shape, its upper and lower arms $f^3$ and $f'$ extending rearwardly from the connecting post $f^2$.

By reference more particularly to Fig. 1 of the drawings, it will be seen that the bar $e$ of the supporting frame passes loosely through suitable loops 10 attached to the stubble side of the binder frame B, to permit the supporting frame F to be moved back and forth in order to effect the desired adjustment of the binder mechanism according as long or short grain is to be cut. The lower end of the supporting arm 3 is preferably formed with a hook as seen in Figs. 1 and 2, to engage with the lower edge of the angle bar or rail $b$, so as to securely hold the roller 2 upon the rail.

Upon the stubble side of the binder frame B are attached suitable bearings 12 (one only being shown) wherein will be journaled the harvester drive shaft 13 (see Figs. 1 and 17) that has motion imparted thereto in any convenient manner. The harvester drive shaft 13 is formed with a longitudinal groove 15 to receive a spline formed upon the hub 16 of the sprocket wheel 17, so that the sprocket wheel can be moved lengthwise upon the shaft 13 while remaining in constant gear therewith. The periphery of the sprocket wheel hub 16 is formed with an annular groove 18 into which will set the sustaining arm 3 of the binder frame F, so that as the binder frame is adjusted lengthwise it will cause a corresponding shift of the sprocket wheel to maintain this wheel in proper relation with the binder mechanism. From the sprocket wheel 17 extends a sprocket chain 19 that leads over a sprocket wheel 20 that is fast onto the end of the packer shaft G, this packer shaft G passing through and being sustained by the housing 7, and the packer box 4. (See Figs. 2 and 6.)

The opening 21 in the housing 7 through which the packer shaft G passes, is preferably formed considerably larger than the shaft and within this opening is held (with a rather loose fit) the journal sleeve 22, that is keyed to the housing 7, preferably by means of a lug 23 that projects from the sleeve 22 into a notch 24 formed in the housing 7. (See Figs. 6 and 11.) My purpose in thus employing a journal sleeve 22 is to enable a new bearing sleeve for the packer shaft G to be readily substituted for a bearing sleeve that has become worn, and this is a desirable feature since the bearings of the packer shaft are subjected to severe wear.

The packer shaft G is provided with the usual cranks $g$ and $g'$ whereby will be carried the packer arms G' and G², these packer arms being of the usual construction found in what is known as the "Appleby" type of binder; that is to say, each of the packer arms is formed at a distance below its upper end, with a spur G³ and at its rear end is pivotally connected to a link, the opposite end of which link is connected to a fixed part of the binder mechanism. In the construction shown, the link 25 at the end of the packer arm G' has its upper end connected to an eye 26 formed in the housing 7, while the link 25ª for the packer arm G² has its upper end pivotally connected to an eye 27 formed at the outer portion of the end bars $e^2$ of the supporting frame E. (See Fig. 2.) The cranks $g$ and $g'$ of the packer shaft G are oppositely set in the usual manner to secure the alternating movement of the packer arms through the slots of the binder deck or table C. The packer box 4 wherein is journaled the rear end of the packer shaft is provided with a long bearing for this shaft (see Fig. 8) and is bolted, as shown, to the arm $e^2$ of the sustaining frame E (see Fig. 2) so that this packer box can be replaced when worn. To this packer box 4 of the packer shaft G is attached an arm or bar 30, that carries at its end the needle stud or shaft 31, whereon is pivotally sustained the needle arm H and whereon also is pivotally sustained the compressor frame K, the end of this needle stud or shaft 31 entering the open end of the lower arm $f'$ of the binder frame. (See Figs. 2, 6 and 9.) The compressor frame K is preferably of the construction illustrated in Fig. 3 of the drawings, and to this frame is adjustably united by the bolt and slot connection 32, the compressor hook K' that projects through the binder deck or table in the usual manner. As the packer shaft is in constant gear with the main drive shaft, it is manifest that the packer arms will be constantly driven to force the grain against the compressor hook K' as the grain is delivered by the conveyer mechanism, on to the binder deck or table C. When a sufficient amount of grain to form a bundle has been thus accumulated by the packer arms, it is necessary that the compressor hook K' and frame K should be rocked in order to operate a trip to permit the mechanism to be brought into operation, whereby the cord will be tied around the bundle, and whereby the bundle thus bound will afterward be discharged from the machine, and the means whereby these parts are brought into operation will next be described. The compressor frame K is formed with the brackets $k$ and $k'$ through which passes the needle stud or shaft 31 whereon the compressor frame K is held, and one of these brackets $k$ is formed with an arm $k^2$ having a loop $k^3$, through which passes the trip stop 33 which serves to hold out of action the clutch mechanism whereby movement is imparted from the packer shaft to the mechanism that operates the needle and its co-acting parts. The free end of this trip stop is adapted to be brought into position to arrest a drive dog to be presently described, while the opposite end of this trip stop 33 is pivotally connected to a lug 34 formed upon the hub $h$ of the needle arm H. (See Figs. 6 and 10.) Preferably the hub $h$ of the needle arm H is formed very long as shown, and of two sections, the bracket $k'$ of the compressor frame K extending between the sections of the hub $h$, while the bracket $k$ of the compressor frame extends between the end of the hub and the end of the lower arm $f'$ of the binder frame F. (See Fig. 6.)

The brackets $k$ and $k'$ of the compressor frame K (see Figs. 3, 9 and 10) are perforated as at $k^4$ to receive a stud 35 whereon is held the long hub 36 of the compressor crank 37 (see Figs. 5 and 9) this hub being provided with an upward extension 38 that is perforated to receive one end of the spring-carrying bolt 40, the end of this bolt being headed to prevent its withdrawal from the extension 38. This spring-carrying bolt 40 passes also through a perforated lug 41 formed upon the under side of the compressor-frame K, and upon this bolt is held the coiled spring 42, the outer end of this spring bearing against a nut and washer 43 that are carried upon the threaded end of the bolt 40; the nut serving not merely to hold the spring upon the bolt, but also to permit the tension of the spring to be adjusted as may be required. (See Fig. 10.)

The compressor crank 37 is formed with a pin preferably carrying a friction roller 44 that is adapted to bear upon a cam extension 50 formed upon the side of the main operating wheel L, this cam extension having affixed thereto a spring cam L' against which also the friction roller 44 will bear as the main operating wheel L is revolved. With the main operating wheel L meshes an idler gear pinion 51 that is journaled within the upper part of the housing 7, this housing being formed with the over-hanging wall or box-like compartment 52 which serves not only to afford a bearing for the shaft of the idler gear pinion 51, but serves also to incase this pinion, and protect the same against becoming foul or clogged. The boxing 52 of the housing 7 is also extended as at 53 around the opening 21 through which passes the packer shaft G (see Figs. 2, 6, and 10) in order to protect the clutch-pinion 54 that sits loosely upon the packer shaft G. This clutch pinion 54 has its outer end formed with a shrouding 55 which co-operates with the overhanging extension 53 of the housing 7 in protecting the pinion 54 against becoming foul. (See Fig. 11.) The clutch pinion 54 is formed with the long hub 56, the end of which bears against the crank $g$ of the packer shaft.

To the shrouding 55 of the clutch pinion 54 is attached one end of a spring 57, the opposite end of which engages with the drive dog M (see Figs. 10 to 14) that is journaled upon a pin 58 projecting laterally from the shrouding 55 of the clutch pinion 54, this spring serving to normally draw the drive dog M in the direction of the arrow Fig. 12. The drive dog M is formed with a lateral extension $m$ adapted to engage with the end of the trip stop 33 when this trip stop is in the position of rest seen in Fig. 10 of the drawings, its downward movement at such time being restricted by a lug 59 projecting from the boxing 52 of the housing 7. The drive dog M is formed also with the tail piece or projection $m'$, which, when the trip stop 33 has been raised to release the drive dog M and permit it to be swung about its pivot point, by the spring 57, to the position shown by dotted lines in Fig. 12, will project into the path of the driving rollers $g^2$ that extend from the side of the crank $g$ of the packer shaft. It will be observed by reference to Fig. 12 of the drawings that the face of the hub 56 of the clutch pinion 54 is flattened opposite the point at which the drive dog M is pivoted, so as to limit the turning movement of this dog. The main operating wheel L is keyed to the binder drive shaft $L^2$ that is journaled in the depending portion 60 of the main housing 7, and in the journal bracket $f$ depending from the lower arm $f'$ of the binder frame F. (See Fig. 2.) The outer end of the binder shaft $L^2$ is formed with the crank 61, to the pin 62 of which crank is connected one end of the pitman 63, the opposite end of this pitman being attached as at 64, to the extension 65 of the needle arm H. Upon the outer end of the crank pin 62 is pivotally held the discharge arm N (see Figs. 6 and 9) the free end of which is adapted to work through the binder deck or table C to discharge the bundles at proper times, while the opposite end of this discharge arm is connected to one end of a swinging link $n$, the opposite end of this link being fastened within an eye or opening $n'$ (see Figs. 6, 7 and 8) formed in the packer box 4.

From the foregoing description, the operation of the parts hereinbefore described will be seen to be as follows: As the cut grain is delivered by the conveyer mechanism on to the binder deck or table C, it is forced by the packer arms $G'$ and $G^2$ against the compressor hook $K'$ until a sufficient amount of grain has accumulated to form a bundle. As the packer arms $G'$ and $G^2$ are thus packing the grain to form the bundle, it is found in practice that as the packer arms recede from the grain, there is a tendency of the grain to jump or spring back after each packer leaves it, and this is particularly noticeable when the machine is working in short and thin grain. In order to resist this backward movement of the grain under the action of the packer arms, I provide the breast plate $O^2$ (to be presently described) with a depending check plate or stop J preferably of the shape shown (see Figs. 1, 24 and 28), and beneath which the grain will be forced as the bundle is accumulated. The check plate or stop J has its front end pivoted upon a bolt $j$ passing through the front end of the breast plate $O^2$ and about this pin is coiled a spring $j'$ one end of which is connected to the check plate or stop J while the opposite end bears upon the bar $O^4$ by which the front end of the breast plate $O^2$ is connected with the shield or apron $O^5$ that leads to the top of the conveyer frame, as well understood in the art  The opposite or free end of the check plate or stop J is formed with a lug or flange $j^2$ (see Fig. 24) adapted to bear against the lower portion of the breast plate and limit the downward movement of the free end of the check plate or stop J under the force of the spring $j$. Hence it will be seen that as the grain is forced beneath this check plate or stop J, the plate will be free to rise against the force of the spring $j$, but the lower point $j^3$ of the stop or check plate will engage the grain about its center, and will serve to prevent the backward jumping of the grain as the packer arms recede. In order to hold the ends of the grain during the packing operation, the usual check springs or arms I are employed, the upper ends of these arms being coiled about and attached to the spring bar $I'$ that has one end bolted to the post $f^2$ of the binder frame F, the central portion of this spring bar $I'$ being braced by the tie rods $i$ that are bolted to the ears $i'$ projecting from the end of the upper arm $f^3$ of the binder frame. (See Figs. 2 and 17.)  As the grain is thus forced against the compressor hook $K'$, the pressure of the grain tends to rock the compressor frame K about the shaft whereon it is journaled, but this tendency to rock is governed by the spring 42 in manner to be next described; that is to say, as the compressor hook $K'$ and the compressor frame are thus pressed backward by the force of the grain under the action of the packer arms, the backward rocking of the compressor hook and frame tends to move downward the hub 36 of the compressor crank 37, but as the outer end of this crank is held against movement it follows that as the hub 36 is thus forced downward it will draw the extension 38 forward and away from the lug 41, thereby causing the bolt 40 to compress the coiled spring 42. Hence it will be seen that the coiled spring 42 will resist the rocking movement of the compressor hook until sufficient grain has been accumulated by the packer arms to form a bundle at which time the compressor hook will have been rocked so far backward against the force of the coiled spring 42 that the arm $k^2$ of the compressor frame K in its upward movement will have lifted the trip stop 33 out of engagement with the lug $m$ of the drive dog M. When the trip stop 33 is thus lifted out of engagement with the drive dog, the spring 57 will swing the drive dog M about its pivot point, to the position seen by dotted lines in Fig. 12, and at such time, the tail piece or projection $m'$ of the drive dog will extend into the path of the rollers $g^2$ that project from the side of the constantly rotating packer shaft. Hence it will be seen that as the packer shaft rotates one of its rollers $g^2$ will contact with the tail piece or projection $m'$ of the drive dog M, and will force this dog and the clutch pinion 54 to which the dog is attached, to revolve with the packer shaft G, and the clutch pinion 54, will, through the medium of the idler gear pinion 51, impart revolution to the main drive wheel L and its shaft $L^2$. As the main drive wheel L and its shaft $L^2$ are thus driven, the crank 61 at the end of the binder drive shaft $L^2$, will, through the medium of the pitman rod 63 impart the upward movement to the needle arm H to cause this arm to lay the cord about the bundle of grain that has been accumulated upon the binder deck C, it being understood of course that the cord will pass through the eye $h^2$ of the needle, and through an eye $h^3$ formed in the free end of the arm or bar 30. (See Figs. 2 and 6.) As the main drive wheel L is thus caused to revolve and as the needle arm H is thus caused to lay the cord about the bundle of grain upon the binder deck C, the movement of the main drive wheel L will cause the cam 50 and the cam spring $L'$ attached thereto, to pass beneath the friction roller 44 at the end of the compressor crank 37, (see Figs. 5 and 10) thereby forcing the roller 44 to rise slightly and the compressor crank to rock about its journal pin or stud 35. By reference to Fig. 10 it will be seen that when the compressor hook $K'$ has been forced backward to the position there shown by dotted lines, the extension or shoulder $K^5$ (see Figs. 4 and 10) of the compressor frame K will be brought to bear against the compressor crank 37 so that as this crank is rocked in upward direction under the stress of the cam 50, and the cam spring L', the compressor frame K and the compressor hook K' will be rocked upward slightly with a yielding pressure incident to the eccentric shape of the cam spring L', thereby tending to press the grain against the needle arm during the time that the cord is being bound about the bundle. As soon, however, as the cam spring L' has passed from beneath the roller 44 of the compressor crank, during the revolution of the main drive wheel L in the direction shown by the arrow Fig. 10, the roller 44 and the compressor crank 37 will be free to move suddenly inward, and this will leave the compressor hook K' and the compressor frame K free to rock backward to about the level of the binder deck C so as to permit the bundle of grain now bound to be discharged from the binder deck or table; it being obvious that during this backward movement of the compressor hook and frame, the connected end of the trip stop 33 will be forced slightly upward into that portion of the slot in the binder deck or table that is covered with the movable plate 68 that serves to guard this slot and permit access to the parts beneath it. By the time that the main drive wheel L has made such part of a revolution as to cause the spring cam L' to pass completely beneath the roller 44 of the compressor crank 37, the needle arm H will have laid the cord about the bundle and the knotter mechanism (to be presently described) will have completed its work, and the bundle will be ready to be discharged from the binder deck or table C. While the binder drive shaft $L^2$ has thus operated the needle arm H, the crank 61 of this binder drive shaft, by its connection with the discharge arm N, has brought the free end of this discharge arm through the slot of the binder deck or table and in position behind the bundle in readiness to discharge the bundle from the table. Now as the movement of the binder drive wheel L and the main drive shaft $L^2$ continues, it is manifest that the needle arm H will be rocked backward while the bound bundle is discharged and during this backward movement of the needle arm, the crank 61 of the binder drive shaft will cause the free end of the discharge arm M to move above and along the binder deck or table C, and force the bound bundle of grain therefrom. By reference more particularly to Fig. 1 of the drawings, the relative movement of the needle arm H and the discharge arm N will be more readily observed and it will be plain that as the main drive wheel L is moved in the direction of the arrow there shown, while the needle arm H is being forced upward above the table to lay the cord about the grain, the free end of the discharge arm N is being brought to a position in readiness to thrust the bundle from the table; and it will be plain also that as the needle arm in the further movement of the binder drive shaft $L^2$ is caused to recede, the free end of the discharge arm N is caused to advance and force the bundle from off the binder deck or table. By reference more particularly to Fig. 10 of the drawings, it will also be seen that as the main drive wheel L is about to complete its revolution, the roller 44 of the compressor crank 37 will be struck by the face $50^a$ of the cam 50, attached to the main drive wheel L, and the roller will thus be caused to ride over the shoulder of the cam until it occupies its seat on the face of the cam as shown by full lines in Fig. 10 of the drawings. As the compressor crank 37 is thus acted upon by the face $50^a$ of the cam 50, the upward swinging of the compressor crank will, by reason of its contact with the extension $k^5$ of the compressor frame K, cause the compressor frame and the compressor hook to be rocked upward until they assume the position shown by full lines in Fig. 10, and this rocking movement of the compressor frame will cause the free end of the trip stop 33 to be swung downward into position to engage the extension $m$ of the drive dog M, thereby arresting the further movement of this dog and causing it to be rocked until its tail piece $m'$ is forced into the position seen by full lines in Figs. 10 and 12, and consequently passes out of the line of travel of the drive rollers $g^2$, and the crank $g$ of the drive shaft G. Hence it will be seen that when the main drive wheel has been caused to make one complete revolution necessary to effect the proper movement of the needle arm H, and of the discharge arm N in manner just defined, the drive dog will be thrown out of action, and the mechanism whereby the needle arm, the discharge arm and the knotter mechanism (to be presently described) are operated, will be temporarily thrown out of action, and the compressor hook will be brought to position to co-operate in the accumulation of a new bundle of grain.

Before passing to the description of the knotter mechanism I will describe the upper ejector arms, which co-operate with the lower ejector arm in thrusting the bound bundle from the binder deck or which may be used independently of the lower ejector arm, as desired. To the front end of the binder drive shaft $L^2$ is connected a driving crank $L^3$ which, through the medium of a pitman rod or link 70, imparts oscillation to a longer crank arm 71 that is fixed to the front end of the knotter drive shaft O that extends through the upper arm $f^3$ of the binder frame F. (See Fig. 2). In the construction illustrated more particularly in Figs. 1 and 2 of the drawings, the relative lengths of the cranks $L^3$ and 71 are such that nearly one-half of the complete revolution will be imparted to the knotter drive shaft O. The knotter drive shaft projects to a distance beyond the end of the upper arm $f^3$ of the binder frame F, and upon this projecting portion of the knotter drive shaft O is mounted the bracket bearing O' whereby is sustained the stubble end of the breast plate $O^2$, this bracket O', and breast plate $O^2$ serving to sustain the knotter mechanism, as will pres-

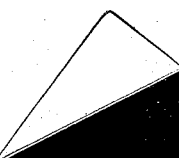

ently more fully appear. Upon the projecting portion of the knotter drive shaft O is fixed the knotter cam wheel $O^3$. On the hub $o$ of this knotter cam wheel $O^3$ is carried one of the spring ejector arms P, while upon a sleeve $o'$ that is keyed to the outer portion of the projecting end of the knotter drive shaft O is carried the other spring ejector arm P'. The ejector arm P is preferably of the construction illustrated more particularly in Fig. 19 of the drawings, that is to say, one end of the spring of which this ejector arm is formed, is connected to a pin or stud 80 extending from the side of the knotter cam wheel $O^3$, this end of the spring being then coiled about the hub $o$ of the cam wheel and being extended, as shown, to form the ejector arm, and the reversely extended portion $p$ of the spring arm P passes over the stud or pin 80, and through a groove in the shoulder 81 and has its end hooked as at $p'$, to engage with the shoulder 81 formed upon the side of the knotter cam wheel $O^3$. Preferably a nut 84 and broad washer 85 are screwed upon the threaded end of the pin 80, to guard the free end of the spring arm P from slipping off the pin 80 while at the same time permitting this free end to move backward. The spring ejector arm P' has one of its ends connected to a pin 86 projecting from the arm 87 of the sleeve $o'$, this end of the spring arm P', being coiled about the sleeve $o'$, and being then extended to form the discharge arm, while the reversely extended portion $p^2$ of this ejector arm P' passes freely over the pin 86 of the arm 87, and is held against lateral movement by the washer 88 and nut 89. From this description of the spring ejector arms P and P', it will be seen that when by reason of the movement of the knotter drive shaft O, the spring ejector arms P and P' are turned downward and caused to bear against the bundle as it is being bound, the resistance of the bundle to the downward and outward movement of the spring ejector arms, will tend to wind the coiled ends of these ejector arms about the portions to which they are respectively attached, and will tend to force the free ends $p'$ and $p^2$ of these ejector arms outward. It is manifest, however, that as soon as the compressor hook K' and compressor frame K have been released in manner hereinbefore defined, so as to permit the discharge of the bound bundle, the spring ejector arms P and P' will tend to resume their normal shape, and will force the bundle from off the binder deck or table. The spring arms P and P' in this action of discharging the bundle will co-operate with the lower discharge arm N that will rise through the binder deck or table at the rear of the bundle and will be in readiness to force the bundle from the deck when the knotter mechanism has completed its work and when the needle arm has receded and the compressor hook K' has been released. I prefer to give to the ends of the spring ejector arms P and P' the shape shown, the outer member of each of these arms being preferably slightly curved as by this form the ejector arms are caused to pass behind the bundle in better position for exerting a direct thrust of the bundle from the table, whereby the tendency is avoided to force downward the bundle upon the table, which exists with ejector arms that are driven by a rotary movement and in which the free ends are inclined toward the machine to prevent them catching and carrying over the bundle in the act of discharging it from the binder deck or table. Manifestly, as the spring ejector arms P and P' have only an oscillating movement imparted thereto from the knotter drive shaft O, the danger of these arms carrying the bundle over is avoided, as the arms after having discharged the bundle recede to the position shown by full lines in Fig. 1 of the drawings.

In Fig. 17 and in the detail view Fig. 17$^a$ of the drawings are illustrated means whereby a rotary movement may be imparted to the knotter drive shaft O. My improved knotter mechanism to be presently described can be used either with means for imparting a complete rotary movement to the knotter drive shaft, or with the mechanism hereinbefore described, whereby an oscillating movement only is given to said shaft. In this modified construction, the cranks $L^3$ on the end of the binder drive shaft $L^2$, and the crank 71 on the end of the knotter shaft, are of equal lengths and are connected by the pitman 90, the ends of this pitman being connected preferably with a somewhat loose joint to the pin of the crank $L^3$. In this construction also the post $f^2$ of the binder frame is formed with the deflecting seats 75 and 76 with which will contact a pin 77 projecting from the pitman 70 about its center. Hence it will be seen that as the crank $L^3$ is turned in the direction of the arrow Fig. 17$^a$, the pin 77 will contact with the deflecting guide seat 75 about the time that the cranks $L^2$ and 71 are brought into alignment, and this seat 75 will act as a fulcrum to cause the shifting of the crank 71 across the dead center and in like manner during the downward movement of the crank $L^3$, the pin 77 will contact with the seat 76 and cause the shifting of the crank 71 across the dead center on its down stroke. In this manner it will be seen that a continuous rotary movement will be imparted from the binder drive shaft $L^2$ to the knotter drive shaft O. When a continuous rotary movement is thus imparted to the knotter drive shaft, this shaft will be provided with the discharge arms $P^6$ and $P^7$ of usual construction, and attached thereto in the usual or suitable manner. (See Fig. 17.)

My improved knotter mechanism will next be described, reference being had more particularly to Figs. 18 to 28 of the drawings. The stubble end of the breast plate $O^2$ is bolted as at 90 and 91 to the knotter frame O', while the opposite end of the breast plate $O^2$ is bolted as at $o^6$ to the spring bar or rail I' said breast plate having extension $O^4$ that serves to connect the breast plate with the shield or apron $O^5$. The breast plate $O^2$ is of usual construction, being formed with the long slot 92 through which will pass the needle arm H as it rises to lay the cord about the bundle, this long slot or opening being formed with the irregular portion 93 to permit the cord to be tied by the knotter bill and to be drawn therefrom as the bundle is discharged. The knotter frame $O'$ is formed with the two depending arms or portions 94 and 95 that are united together by the bridges 96 and 97, the bridge 97 being shown by dotted lines Fig. 18 and full lines Fig. 21, this knotter frame having a long sleeve or bearing that encircles the knotter drive shaft O. Between the upper portions of the arms 94 and 95 of the knotter frame extends the stud or pin 98 whereon is pivotally held the lever 99, the upper end of this lever being provided with a friction roll 100 that works against the cam face 101 of the knotter cam wheel $O^3$, while the lower end of this lever carries a tucker finger 102 that projects laterally and downwardly therefrom, as more particularly seen in Figs. 18 and 23 of the drawings. The lower end of the lever 99 is formed with a guide arm or extension 103, adapted to assist in holding the cord during the formation of the knot by the knotter bill and is formed also with a shoulder 104 adapted to co-operate with a fixed knife R in severing the cord after the knot has been tied. Within the bridges 96 and 97 of the knotter frame $O'$ is held the knotter bill shaft S that carries at its lower end the knotter bill which comprises the fixed jaw $s$ and the movable jaw $s'$. (See Fig. 29.) The movable jaw $s'$ extends above the fixed jaw $s$ and through the upper portion of the fixed jaw wherein it is held upon a pivot pin, and the rear end of this movable jaw $s'$ is provided with a friction roller $s^2$ adapted to ride beneath a cam lug 110 that projects from the bridge plate 96 of the knotter frame (see Figs. 18 and 25), and is adapted also to ride over the cam shaped spring 111 that is bolted at 112 to the lower portion of the arm 94 of the knotter frame as well understood in the art. Upon the knotter bill shaft S is fixed the pinion $S'$ that meshes with a segment gear 113 formed upon the face of the knotter cam wheel $O^3$. This pinion $S'$ as more particularly shown in Figs. 26 and 27 of the drawings, is formed with the plain faces $s^5$ and $s^6$ adapted respectively to engage with the delay surfaces 115 and 116 formed upon the face of the knotter cam wheel $O^3$, to hold the knotter bill stationary for certain intervals, as will presently more fully appear. The arm 95 of the knotter frame is formed at its lower end with the extension $95^a$ (see Fig. 23) in which is held the pin 120, whereon is journaled the cord-holding disk T. The periphery of this disk T is formed with the usual notches $t$ to receive the cord, and the hub of this disk T (see Fig. 22) is formed with a ratchet wheel $T'$ that will be engaged by the feed pawl U that is pivoted to a pin 121 that is adjustably held within a slot 122 of the lever 99, the adjustment of this pin 121 being effected by means of the screw 123 that passes through a threaded perforation in this lever. The pawl U is forced into normal engagement with the ratchet wheel $T'$ by means of a spring $n$ held upon suitable studs projecting respectfully from the pawl U and from the side of the lever 99 as more particularly shown in Fig. 20 of the drawings. At one side of the disk T is the cord holder $T^2$ the lower portion of which is grooved to receive the edge of the disk, this cord-holder being pivotally connected as at 125 to the arm 95 of the knotter frame (see Fig. 21), and being forced toward the disk T by means of a spring $t^2$ that is bolted to an extension $95^b$ formed at the base of the arm 95 of the knotter frame. The knife R whereby the cord will at proper times be severed is adjustably connected by a screw $r$ to a lug $r'$ formed at the lower end of the arm 95 of the knotter frame, the knife R being preferably formed with a slot $r^2$ to permit its adjustment.

From the foregoing description, the operation of the knotter mechanism will be seen to be as follows: When sufficient grain has been accumulated by the packer arms to cause the binder drive shaft $L^2$ to be thrown into operation through the medium of the clutch mechanism hereinbefore described, the revolution of this shaft will cause an oscillating movement equal to slightly less than one-half of a revolution to be imparted through the crank $L^3$, the pitman rod 70 and the crank 71 to the knotter drive shaft O. By reference to Fig. 1 it will be seen that when the main drive shaft is revolved in the direction of the arrow there shown, the crank $L^3$ will first cause the crank 71 to be swung slightly upward until the crank $L^3$ crosses its mid-stroke position, after which the crank 71 and the knotter drive shaft O connected thereto, will be turned in opposite direction, and this turning of the crank 71, and knotter drive shaft O will continue until the crank $L^3$ passes its opposite mid-stroke position when a reverse movement of the crank 71 and knotter drive shaft O will occur until the parts assume the position of rest seen in Fig. 1 of the drawings. As the knotter drive shaft O is thus operated it will cause the knotter cam wheel $O^3$ to be turned in the direction of the small arrow (Fig. 18) a slight distance, which movement, however, will not affect the operation of the knotter mechanism, the knotter bill being securely retained against movement at such time by reason of the engagement of the plain surface $s^5$ of the knotter pinion with the delay surface 115 on the face of the cam wheel. When however, by the operation of the knotter drive shaft O in manner above defined, the direction of travel of the knotter cam wheel $O^3$ has been reversed, causing this wheel to move in the direction of the large arrow Fig. 18, the cam surface 101 of the knotter cam wheel $O^3$ will contact with the friction roll 100 upon the end of the lever 99 causing this lever to be rocked about its pivot point and causing its lower end to be moved toward the binding cord as will presently more fully appear. The movements of the various parts are so relatively timed that this initial movement of the knotter mechanism will occur just after the needle arm has risen around the bundle and laid its end of the cord into the notch $t$ of the cord holding disk T through which the opposite portion of the cord extends; that is to say, after the needle arm has laid its section of the cord parallel with the section of the cord shown in Fig. 23, and while the parts are in the position of rest there shown, the sections of the cord at such time extending over the jaws $s\ s'$ of the knotter bill. While the two sections of the cord are thus in the notch $t$ of the cord holding disk T, the movement of the knotter cam wheel $O^3$ in the direction of the large arrow Fig. 18, will by reason of the engagement of the cam 101 of this wheel with the roller 100 of the lever 99, cause the tucker finger 102 to pass above the sections of the cord and depress the cord slightly down over the jaws $s\ s'$ of the knotter bill, so as to insure the looping of the cord by the jaws of the bill when the bill is turned to tie the knot as seen by Fig. 24 of the drawings. Shortly after the tucker finger 102 has thus moved forward to depress the cord, the cord holding disk pawl U will engage with the ratchet wheel T' imparting a partial revolution to such wheel and to the disk T and causing the cord to pass into the bight of the grooved cord holder $T^2$, as seen in Fig. 24. Shortly after this movement of the lever 99 has been begun, the segment rack 113 on the face of the knotter cam $O^3$ will engage with the knotter shaft pinion S', the plain face $s^5$ of which pinion will at such time have passed from off the delay surface 115 of the knotter cam wheel $O^3$, and as the segment rack 113 thus engages with the pinion S' it will cause a rotation of this pinion and of the knotter shaft S, forcing the jaws $s\ s'$ of the knotter bill to pass over the two sections of the twine as seen in Fig. 24. As the knotter bill is thus turned to the position seen in Fig. 24, the arm or extension 103 at the end of the lever O', has passed beneath the twine or cord, in readiness to prevent the slipping of the cord from off the knotter bill jaws until the knot is completed, and in this movement of the lever 99 the shoulder 104 has approached the stationary knife R in readiness to sever the twine. As the knotter bill turns from the position seen in Fig. 24 to the position seen in Fig. 25, the movable jaw $s'$ is opened by the working of the friction roll $s^2$ against the cam lug 110 so as to admit the sections of the cord adjacent the cord holding disk between the bight of the jaws and when the knotter jaws have so far turned as to receive the cord the friction roller $s^2$ passes from off the cam lug 110 and is oppositely engaged by the cam spring 111 which causes the movable jaw to firmly hold the cord against the fixed jaw of the knotter bill. After the cord is thus caught between the jaws of the knotter bill, the further rocking of the lever 99 incident to the movement of the knotter cam wheel $O^3$, will cause the shoulder 104 at the lower end of the lever 99 to co-operate with the stationary knife R in severing the cord as seen in Fig. 25; and about the time the cord is thus severed, the knotter bill will have completed its movement and the delay surface 116 of the knotter cam wheel $O^3$ will have passed into engagement with the flat face $s^6$ of the pinion S', so as to hold the knotter bill in rigid position while the cord is being drawn from off its jaws in the act of discharging the bound bundle from the machine. It is manifest that when the knotter cam wheel $O^3$ has a reverse movement imparted thereto under the action of the knotter drive shaft O after the manner above defined, the knotter bill and the parts operated by the cam wheel $O^3$ will be restored to the position at rest seen in Fig. 23 of the drawings. It is obvious that a complete rotary movement may be imparted to the knotter cam wheel $O^3$ as hereinbefore described, and in such case the movement of the cam wheel will be so timed as to bring the knotter jaws and co-acting parts into the position of rest when a complete revolution of the cam wheel is effected. It will be observed by reference more particularly to Figs. 20 and 21 of the drawings, that the feed pawl U on the lever 99 has its free end furnished with a check lug or extension $u^2$ which, as the feed pawl is advanced, extends closely behind the notch $t$ of the cord holding disk and serves to prevent the slipping of the cord from the notch of the disk as the latter is revolved.

By reference more particularly to Figs. 18, 24 and 25 of the drawings, it will be seen that the upper face of the breast plate $O^2$ is formed at a point in advance of the tucker finger 102 and in advance of the knotter bill jaws $s$ and $s'$, with a raised guide and guard rib $o^7$, the purpose of this rib being to insure the laying of the twine across the jaws of the knotter bill as the twine is drawn tightly in the binding operation, and to guard the tucker finger 102 from being struck by the needle arm.

By reference more particularly to Fig. 22 of the drawings, it will be seen that the cord-holder $T^2$ which co-operates with the cord-holding disk T, has its lower end provided with an extension $t^5$ adapted to engage the ratchet wheel T' and check the ratchet wheel against backward movement. It will thus be seen that the cord-holder $T^2$ performs the additional function of the check spring heretofore employed for the purpose of arresting the backward movement of the cord-holding disk.

Having thus described my invention, what I claim as new, and desire to secure by Letters Patent, is—

1. A grain binder comprising a binder deck or table whereon the grain is received, a binder frame carrying a knotter mechanism above said binder deck or table an intermittently operated binder drive shaft, suitably connected to said mechanism for driving the same, a single short packer shaft located entirely and centrally beneath the binder deck or table, packer cranks wherewith said shaft is provided, a gear or sprocket rigidly secured to said packer shaft and serving to impart motion thereto, suitable means for imparting continuous movement to said gear wheel and packer shaft, and a suitable clutch mechanism for imparting movement to said binder drive shaft from said packer shaft, said binder drive shaft and said clutch mechanism being located beneath the binder deck, substantially as described.

2. A grain binder comprising a binder deck or table, whereon the grain is received, a binder frame carrying a knotter mechanism above said binder deck or table, and suitable packer arms, a single packer shaft located entirely and centrally beneath the binder deck or table having an end projecting beyond its bearings and being provided with one crank between its bearings and another crank secured to said projecting end for actuating said packer arms, a gear or sprocket wheel mounted upon said packer shaft and means for imparting continuous rotation to said shaft, an intermittently operated binder drive shaft and suitable means for imparting movement to said binder drive shaft from said packer shaft, substantially as described.

3. A grain binder comprising a binder deck or table whereon the grain is received, a binder frame carrying a knotter mechanism above said binder deck or table, an intermittently operated binder drive shaft located beneath said binder deck or table, suitable packer arms, a single short packer shaft located entirely and centrally beneath the binder deck or table, said packer shaft being provided with cranks for operating said packer arms a sprocket wheel secured in fixed position upon said packer shaft, a harvester drive shaft geared to said sprocket wheel whereby continuous rotation is imparted thereto, clutch mechanism upon said packer shaft intermediate said sprocket wheel and said cranks for imparting movement to said drive shaft, said sprocket wheel and said clutch mechanism being located beneath the binder deck or table, substantially as described.

4. A grain binder comprising a binder deck or table whereon the grain is received, a binder frame carrying a knotter mechanism above said binder deck or table, a single short packer shaft mounted in bearings rigidly secured to said binder frame and located entirely and centrally beneath the binder deck or table and provided with two cranks, suitable packer arms pivoted directly to said cranks, a sprocket wheel held in fixed position upon said short packer shaft, a gear wheel and clutch mechanism also mounted upon said packer shaft and located beneath the binder deck or table, a binder drive shaft geared by said clutch mechanism to the packer shaft beneath the binder deck or table and a harvester drive shaft provided with a sprocket wheel mounted in a manner free to slide thereon, and a chain connecting said sprocket wheel with the sprocket wheel on the short packer shaft, substantially as described.

5. A grain binder comprising a harvester frame, a harvester drive shaft journaled therein, a sprocket wheel mounted on said harvester drive shaft, in a manner free to slide thereon, a binder deck or table whereon the grain is received, a binder frame carrying a knotter mechanism above said binder deck or table, a single short packer shaft mounted in fixed bearings in said binder frame and located entirely and centrally beneath the same, a sprocket wheel fixed to said packer shaft and suitably connected with the sprocket wheel on the harvester shaft, an intermittently operated binder drive shaft located beneath the binder deck or table and a clutch mechanism located beneath the binder deck or table for imparting movement to said binder drive shaft from said packer shaft, substantially as described.

6. In a grain-binder, the combination with the packer shaft having packer cranks of driving rollers carried by one of said packer cranks, whereby the use of a separate crank for said rollers is avoided, a clutch mechanism comprising a drive dog located in close proximity to the packer crank carrying the driving rollers and having a tail-piece or projection $m'$ adapted to be thrown into the path of said driving rollers when motion is to be imparted from the packer shaft to the devices that operate the binder mechanism, and suitable connecting mechanism located beneath the binder deck or table adjacent said clutch mechanism and serving to transmit motion from the packer shaft to the binder drive shaft, said binder drive shaft being located beneath the binder deck or table and arranged to drive the knotter mechanism, substantially as described.

7. In a grain binder, the combination with the binder deck or table of a pivoted needle arm, a binder drive shaft provided at its end with a crank arm, a link connecting said crank arm and said needle arm, whereby said needle arm is directly driven from said binder drive shaft, and a knotter mechanism comprising a knotter drive shaft in gear with and also directly driven by said binder drive shaft, substantially as described.

8. In a grain binder, the combination with a binder deck or table whereon the grain is received, a needle arm, a binder drive shaft provided with a crank arm, a discharge arm for ejecting the bundles, a link connecting said crank arm and said needle arm, said discharge arm being also connected to said crank arm on the binder drive shaft whereby said crank arm serves to drive both said needle arm and said discharge arm, substantially as described.

9. In a grain binder, the combination with the packer arms, the compressor hook, a pivoted frame for sustaining said compressor hook, a clutch mechanism, and a trip lever for controlling said clutch mechanism actuated by said pivoted frame, of a compressor crank pivotally sustained by said compressor frame, and cam mechanism for operating the compressor mechanism, and with which the free end of said compressor crank engages, substantially as described.

10. In a grain binder, the combination with the packer arms, a compressor hook, a pivoted frame for sustaining said compressor hook, a clutch mechanism, and a trip lever for controlling said clutch mechanism, actuated by said pivoted frame, of a compressor crank pivoted to said compressor frame, an arm 38 rigidly connected with said crank and a spring acting upon said arm 38 and serving to hold the compressor crank in engagement with the cam, and serving also to resist the backward movement of the compressor hook, substantially as described.

11. The combination with the packer arms, the compressor hook, a pivoted frame for sustaining said compressor hook, a clutch mechanism and a trip lever for controlling said clutch mechanism, of a compressor crank 37, a cam located adjacent to and serving to be operated by said compressor crank, and with which it is directly engaged and a spring serving to hold said compressor crank in normal engagement with said cam, and serving also to resist the downward movement of the compressor frame, substantially as described.

12. In a grain-binder, the combination with the packer arms, the compressor hook, a pivoted frame for sustaining said compressor hook, a clutch mechanism and a trip lever for controlling said clutch mechanism, of a compressor crank pivotally sustained by said compressor frame, cam mechanism located adjacent to said compressor crank and with which said crank is directly engaged, and spring mechanism for holding said crank in engagement with said cam mechanism, substantially as described.

13. In a grain binder, the combination with packer arms and mechanism for operating the same, of the compressor hook K', the compressor frame K whereby said hook is sustained a compressor crank 37 pivotally connected beneath said compressor frame, a spring 42 and a spring-carrying rod 43 sustained by said compressor frame, said rod being connected to an arm of the compressor crank, a cam 50 and spring cam L', against which said compressor crank will bear, a clutch mechanism connected with the packer shaft, and a trip arm 33 connected with the compressor frame, and adapted to control said clutch mechanism, substantially as described.

14. In a grain binder, the combination with the binder-frame having an upper arm, and a knotter drive shaft carried by said binder frame, of spring discharge arms mounted upon said knotter drive shaft, and means for imparting a rocking movement to said spring discharge arms, substantially as described.

15. In a grain-binder, the combination with a knotter drive shaft, and its cam wheel $O^3$ having a cam face 101, of a pivoted lever 99 provided at its lower end with a tucker finger 102 to depress the twine in front of the knotter bill jaws, substantially as described.

16. In a grain binder, the combination with a knotter drive shaft and its cam wheel, of a knotter mechanism comprising an adjustable stationary knife R, and a rocking lever 99, adapted to be operated by the cam wheel, and having its end provided with a shoulder 104 to co-operate with the knife R in severing the twine, substantially as described.

17. In a grain-binder, the combination with a knotter drive shaft and its cam wheel, of a knotter mechanism comprising a cord-holding disk, a ratchet wheel for operating said disk, and a pawl for advancing said disk, said pawl having a guard extension or projection $u^2$ for preventing the slipping of the twine from out the notch of the cord-holding disk, and suitable means for operating said pawl, substantially as described.

18. In a grain-binder, the combination with a knotter mechanism comprising a knotter bill and a tucker finger, and suitable means for operating the same, of a breast plate formed with a space or way 92, to admit the needle arm, and having a deflecting transverse rib $o^7$ upon its upper surface at a point in front of the knotter bill jaws, to insure the laying of the twine over said jaws and to protect the tucker-finger, substantially as described.

19. In a grain binder, the combination with the cord holding disk, and a ratchet wheel for imparting rotation to said disk, of a cord-holder for co-operating with the disk in engaging the cord, said cord-holder being provided with an extension rigidly secured thereto to arrest the movement of the ratchet wheel, substantially as described.

PAUL HANSON.

Witnesses:
GEORGE P. FISHER, Jr.,
T. B. CARPENTER.